United States Patent
Hagiwara et al.

(10) Patent No.: US 12,157,457 B2
(45) Date of Patent: Dec. 3, 2024

(54) OIL DILUTION INHIBITING APPARATUS

(71) Applicant: SUBARU CORPORATION, Tokyo (JP)

(72) Inventors: Naonori Hagiwara, Tokyo (JP); Yuuki Ito, Tokyo (JP); Kenu Takahashi, Tokyo (JP); Yuki Sugie, Tokyo (JP); Kosuke Yoshida, Tokyo (JP); Yuuma Suzuki, Tokyo (JP); Shogo Watanabe, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 18/459,986

(22) Filed: Sep. 1, 2023

(65) Prior Publication Data

US 2024/0083407 A1 Mar. 14, 2024

(30) Foreign Application Priority Data

Sep. 14, 2022 (JP) ................. 2022-145808

(51) Int. Cl.
| | |
|---|---|
| *B60W 10/10* | (2012.01) |
| *B60W 10/06* | (2006.01) |
| *F02D 19/02* | (2006.01) |
| *F02D 19/12* | (2006.01) |

(52) U.S. Cl.
CPC ............ *B60W 10/10* (2013.01); *B60W 10/06* (2013.01); *F02D 19/02* (2013.01); *F02D 19/12* (2013.01)

(58) Field of Classification Search
CPC .............................. B60W 10/06; F02D 19/02
See application file for complete search history.

(56) References Cited

U.S. PATENT DOCUMENTS

2018/0230921 A1 8/2018 Kitazume et al.

FOREIGN PATENT DOCUMENTS

| JP | 2018047741 A | * | 3/2018 |
| JP | 2018-131940 A | | 8/2018 |

OTHER PUBLICATIONS

JP 201847741.*

* cited by examiner

*Primary Examiner* — Derek D Knight
(74) *Attorney, Agent, or Firm* — Rimon P.C.

(57) ABSTRACT

An oil dilution inhibiting apparatus is configured to inhibit oil dilution caused by mixture of fuel into engine oil. The oil dilution inhibiting apparatus includes a control unit. The control unit is configured to estimate friction of an engine and determine that the oil dilution occurs when the friction of the engine is decreased to a value lower than or equal to a predetermined threshold value to perform control so that the engine is operated at a higher speed.

9 Claims, 3 Drawing Sheets

OIL DILUTION INHIBITING APPARATUS

CROSS-REFERENCE TO RELATED APPLICATIONS

The present application claims priority from Japanese Patent Application No. 2022-145808 filed on Sep. 14, 2022, the entire contents of which are hereby incorporated by reference.

BACKGROUND

The disclosure relates to an oil dilution inhibiting apparatus that inhibits oil dilution caused by mixture of fuel into engine oil.

So-called oil dilution may occur in an engine. The oil dilution means that engine oil is diluted due to mixture of fuel into the engine oil. Particularly, in an in-cylinder injection engine in which fuel is directly injected into a cylinder, for example, the fuel may adhere to the inner periphery of the cylinder and the fuel on the inner periphery of the cylinder may be mixed with the engine oil to cause dilution of the engine oil due to the fuel (the oil dilution).

When the oil dilution has occurred, for example, the fuel mixed into the engine oil may be volatilized and blowby gas containing a lot of fuel may be breathed into an intake system to cause variation in air fuel ratio (for example, enrichment).

Japanese Unexamined Patent Application Publication (JP-A) No. 2018-131940 discloses a technique to more quickly suppress the variation in the air fuel ratio, which is caused by the volatilization of the fuel in the engine oil. In one example, in this technique, a reflection ratio REF is set as a value proportional to the amount of discharge of the blowby gas into intake air, an amount of fuel injection is corrected using a product of the reflection ratio REF and a dilution learning value LDIL as a correction value, and the value of the dilution learning value LDIL is updated so that a correction value FAF of air fuel ratio F/B comes close to zero under the condition that an amount of fuel dilution of the engine oil is higher than or equal to a predetermined value.

SUMMARY

An aspect of the disclosure provides an oil dilution inhibiting apparatus configured to inhibit oil dilution caused by mixture of fuel into engine oil. The oil dilution inhibiting apparatus comprises a control unit. The control unit is configured to estimate friction of an engine and determine that the oil dilution occurs when the friction of the engine is decreased to a value lower than or equal to a predetermined threshold value to perform control so that the engine is operated at a higher speed.

An aspect of the disclosure provides an oil dilution inhibiting apparatus configured to inhibit oil dilution caused by mixture of fuel into engine oil. The oil dilution inhibiting apparatus comprises circuitry. The circuitry is configured to estimate friction of an engine and determine that the oil dilution occurs when the friction of the engine is decreased to a value lower than or equal to a predetermined threshold value to perform control so that the engine is operated at a higher speed.

BRIEF DESCRIPTION OF THE DRAWINGS

The accompanying drawings are included to provide a further understanding of the disclosure and are incorporated in and constitute a part of this specification. The drawings illustrate an embodiment and, together with the specification, serve to describe the principles of the disclosure.

DETAILED DESCRIPTION

With the technique disclosed in JP-A No. 2018-131940, it is possible to more quickly suppress the variation in the air fuel ratio, which is caused by the volatilization of the fuel in the engine oil. However, rapid inhibition of the oil dilution, which is the cause of the variation in the air fuel ratio, is not considered in the technique in JP-A No. 2018-131940. Accordingly, reduction in performance (reduction in function) of the engine oil due to the oil dilution and so on are not capable of being prevented.

In order to resolve the above problem, it is desirable to provide an oil dilution inhibiting apparatus capable of rapidly inhibiting the oil dilution caused by mixture of fuel into engine oil.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Figure 1:
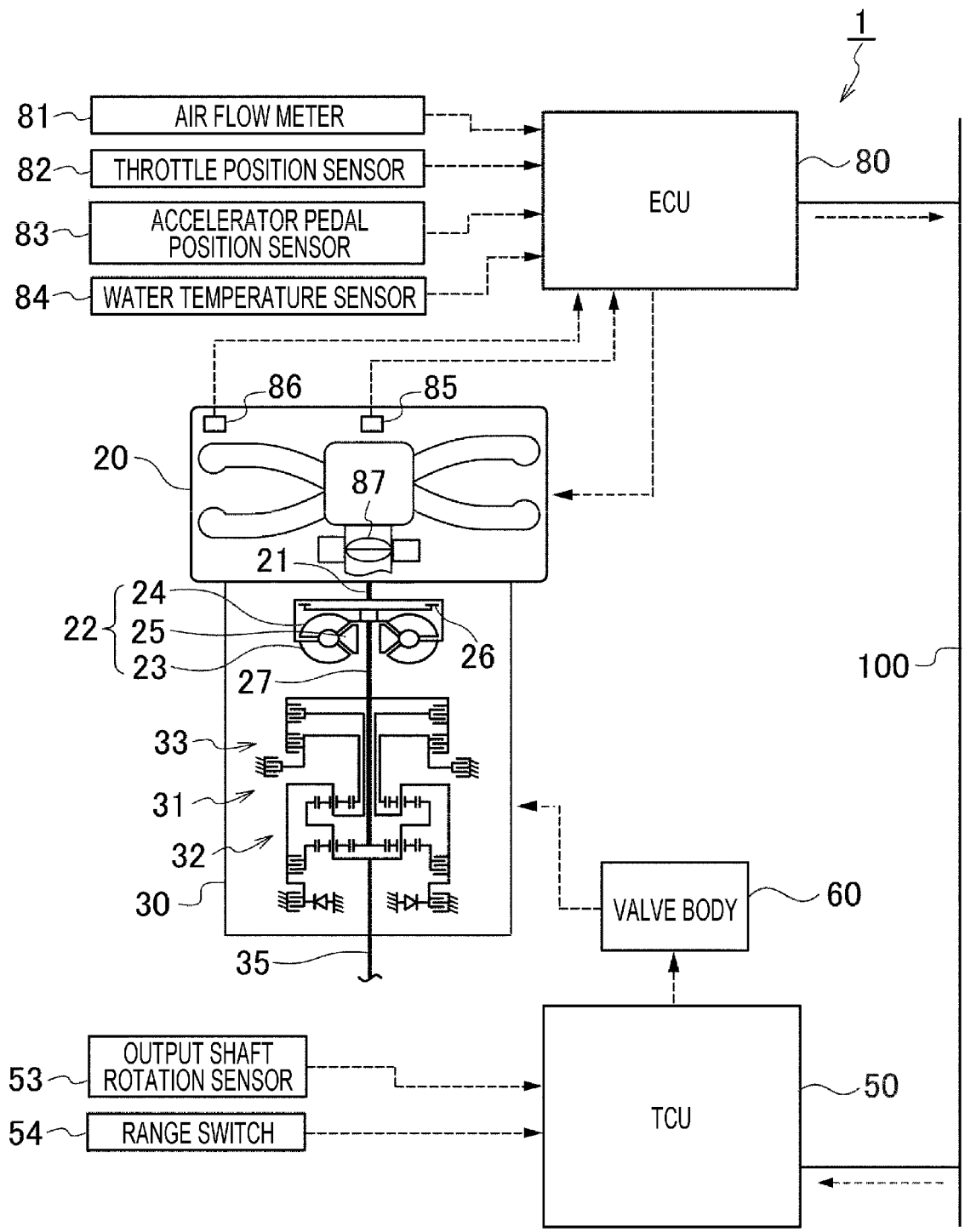
FIG. 1 is a block diagram illustrating a configuration of an oil dilution inhibiting apparatus according to an embodiment, and an engine and an automatic transmission to which the oil dilution inhibiting apparatus is applied.

The configuration of an oil dilution inhibiting apparatus 1 according to an embodiment will herein be described with reference to FIG. 1. FIG. 1 is a block diagram illustrating a configuration of the oil dilution inhibiting apparatus 1, and an engine 20 and an automatic transmission 30 to which the oil dilution inhibiting apparatus 1 is applied.

The engine 20 of any type may be used. For example, the engine 20 is a horizontally opposed four-cylinder gasoline engine for in-cylinder injection. Air taken into the engine 20 through an air cleaner (not illustrated) is squeezed by an electronically controlled throttle valve (hereinafter also simply referred to as "throttle valve") 87 provided in an intake pipe, passes through an intake manifold, and is taken into each cylinder of the engine 20. The amount of air taken into the engine 20 through the air cleaner is detected by an air flow meter 81. In addition, a throttle position sensor 82 that detects the position of the throttle valve 87 is provided in the throttle valve 87. An injector that injects fuel is mounted to each cylinder of the engine 20. In addition, an ignition plug that lights up fuel-air mixture and an igniter built-in coil that applies high voltage to the ignition plug are mounted to each cylinder. In each cylinder of the engine 20, the fuel-air mixture of the intake air and the fuel injected by the injector is lighted up by the ignition plug to be fired. Exhaust gas after the firing is exhausted through an exhaust pipe.

A cam angle sensor 86 for determining the cylinder of the engine 20 is mounted near a camshaft of the engine 20, in addition to the air flow meter 81 and the throttle position sensor 82 described above. A crank angle sensor 85 that detects the position of a crankshaft is mounted near the crankshaft of the engine 20. These sensors are coupled to an engine control unit (hereinafter referred to as "ECU") 80 described below. In addition, various sensors including an accelerator pedal position sensor 83 that detects the degree of depression of an accelerator pedal, that is, the position of the accelerator pedal and a water temperature sensor 84 that detects the temperature of cooling water of the engine 20 are also coupled to the ECU 80.

The step automatic transmission (step AT) 30 (corresponds to an automatic transmission according to an embodiment of the disclosure and hereinafter also simply referred to as the "automatic transmission"), which converts driving force (torque) from the engine 20 and outputs the converted driving force via a torque converter 22 having a clutch function and a torque amplification function, is coupled to an output shaft (crankshaft) 21 of the engine 20.

The torque converter 22 is mainly composed of a pump impeller 23, a turbine runner 24, and a stator 25. The pump impeller 23, which is coupled to the output shaft 21, generates the flow of oil. The turbine runner 24, which is disposed so as to be opposed to the pump impeller 23, receives force of the engine 20 via the oil to drive an output shaft 27. The stator 25 positioned between the pump impeller 23 and the turbine runner 24 rectifies discharge flow (return) from the turbine runner 24 and returns the rectified discharge flow to the pump impeller 23 to generate the torque amplification function. The torque converter 22 includes a lockup clutch 26 that directly couples input to output. The torque converter 22 performs torque amplification of the driving force of the engine 20 to transmit the driving force subjected to the torque amplification to the automatic transmission 30 in a non-lockup state and directly transmits the driving force of the engine 20 to the automatic transmission 30 in a lockup state.

The automatic transmission 30 includes a gear shift mechanism 31 including gear arrays. In one example, the gear shift mechanism 31 includes multiple planetary pinion sets 32 and friction engagement elements 33, such as a clutch and a brake. The multiple planetary pinion sets 32 each include multiple planetary pinions composed of a sun gear, a ring gear, a pinion gear, and so on. The friction engagement elements 33 are provided to switch a force transmission path of the multiple planetary pinion sets (that is, shift the gears). Accordingly, the gear shift of the automatic transmission 30 is performed by engaging and disengaging the friction engagement elements such as the clutch (hereinafter simply referred to as "clutch and so on" or "clutch") 33. A known mechanism may be used as the hardware of the gear shift mechanism 31.

For example, a step automatic transmission having two shafts that are parallel to each other may be used as the automatic transmission 30, instead of the planetary pinion automatic transmission. The step automatic transmission having two shafts that are parallel to each other selectively switches the combination of the gear arrays respectively provided for a pair of shafts that are disposed so as to be parallel to each other through engagement and disengagement of multiple wet clutches to achieve gear shift stages of a finite number. Alternatively, for example, a chain or belt continuously variable transmission (CVT), a dual clutch transmission (DCT), or the like may be used, instead of the step automatic transmission (step AT). The DCT has separate clutches for gear sets of odd-number stages and gear sets of even-number stages and sequentially switches between the clutches for the gear sets of odd-number stages and the gear sets of even-number stages to perform the gear shift.

The driving force (torque) received from the engine 20 is converted by the automatic transmission 30 and, then, is transmitted to driving wheels of a vehicle from an output shaft 35 of the automatic transmission 30 via, for example, a propeller shaft, a differential gear, a drive shaft, and so on (not illustrated).

The engine 20 is controlled by the ECU 80. The ECU 80 includes a microprocessor that performs arithmetic operations, an electrically erasable programmable read-only memory (EEPROM) that stores programs for causing the microprocessor to perform processes and so on, a random access memory (PAM) that stores a variety of data including the results of the arithmetic operations, a backup RAM the content of storage of which is held by a battery, an input-output interface (I/F), and so on. The various sensors including the air flow meter 81, the throttle position sensor 82, the accelerator pedal position sensor 83, the water temperature sensor 84, the crank angle sensor 85, and the cam angle sensor 86 are coupled to the ECU 80, as described above.

In the ECU 80, the cylinder is determined from the output from the cam angle sensor 86 and an engine speed is calculated from variation in the rotation position of the crankshaft, which is detected from the output from the crank angle sensor 85. In addition, in the ECU 80, a variety of information including an amount of intake air, the position of the accelerator pedal, an air fuel ratio of the fuel-air mixture, and the water temperature is acquired based on detection signals received from the various sensors described above. The ECU 80 controls an amount of fuel injection, an ignition time, and the various devices including the throttle valve 87 based on the acquired variety of information to comprehensively control the engine 20.

The ECU 80 is coupled to a transmission control unit (hereinafter referred to as "TCU") 50 that controls the automatic transmission 30 and so on so as to be capable of communication via a controller area network (CAN) 100.

The ECU 80 transmits information including the engine speed, the position of the accelerator pedal, engine torque, and the water temperature of the engine (the temperature of the cooling water) to the TCU 50 and so on via the CAN 100.

Oil pressure for gear shift of the automatic transmission 30, that is, the engagement and the disengagement of the clutch and so on 33 described above is controlled by a valve body (control valve) 60. The valve body 60 adjusts the oil pressure discharged from the oil pump by opening and closing an oil path in the valve body 60 using a spool valve and a solenoid valve (electromagnetic valve) operating the spool valve to supply the oil pressure for engaging and disengaging the clutch and so on 33 to the clutch and so on 33.

Gear shift control of the automatic transmission 30 is performed by the TCU 50. In one example, the TCU 50 adjusts the oil pressure to be supplied to the clutch and so on 33 by controlling driving of the solenoid valve composing the valve body 60 described above to change the gear shift stage of the automatic transmission 30.

An output shaft rotation sensor 53 that is mounted near the output shaft 35 of the automatic transmission 30 and that detects the number of rotations of the output shaft 35 is coupled to the TCU 50. In addition, a range switch 54 that detects the selected position of a shift lever and so on are coupled to the TCU 50. Furthermore, the TCU 50 receives information including a wheel speed (vehicle speed), the engine speed, the position of the accelerator pedal, and the engine torque via the CAN 100.

The TCU 50 includes a microprocessor that performs arithmetic operations, an EEPROM that stores programs for causing the microprocessor to perform processes, a gear shift map, and so on, a RAM that stores a variety of data including the results of the arithmetic operations, a backup RAM the content of storage of which is held by a battery, an input-output I/F, and so on.

The TCU 50 performs the gear shift control of the automatic transmission 30 based on a variety of information including the acquired number of rotations of the output shaft (the vehicle speed), the position of the accelerator pedal, and the shift position of the shift lever (the state of the range switch 54). At this time, the TCU 50 automatically changes the gear shift stage based on the operation state (for example, the position of the accelerator pedal or the vehicle speed) of the vehicle in accordance with a gear shift diagram (a gear shift map). The gear shift diagram (the gear shift map) is stored in the EEPROM in the TCU 50 or the like. The TCU 50 controls a gear shift ratio (the gear shift stage) of the automatic transmission 30 so that the engine 20 is operated at a higher speed in response to a request from the ECU 80 (this will be described in detail below).

Particularly, the ECU 80 has a function to rapidly inhibit the oil dilution, caused by mixture of the fuel (gasoline) into the engine oil, in coordination with the TCU 50. In each of the ECU 80 and the TCU 50, the programs stored in the EEPROM or the like are executed by the microprocessor to realize the function. In one embodiment, the ECU 80 and the TCU 50 may serve as a "control unit".

The ECU 80 estimates friction of the engine 20. The ECU 80 determines that the oil dilution occurs if the friction of the engine 20 is reduced to a value lower than or equal to a predetermined threshold value and performs control so that the engine 20 is operated at a higher speed, compared with a case in which the oil dilution does not occur.

If the oil dilution occurs, the kinematic viscosity of the engine oil is decreased to decrease the friction of the engine 20, thus decreasing an amount of intake air for keeping an idling engine speed to a predetermined speed. That is, the amount of intake air for keeping the idling engine speed to a predetermined speed is an index value having a correlation with the friction of the engine 20 (and the presence of the oil dilution). In one example, the ECU 80 learns a shift (deviation) of the amount of intake air for keeping the idling engine speed to a predetermined speed (the amount of intake air during idling) from a reference value. For example, the ECU 80 learns the shift from the reference value using a feedback value for correcting the shift of the amount of intake air during idling (the position of the throttle valve) from the reference value (a target position) (a feedback value for correcting the throttle valve 87 to an open direction).

The ECU 80 determines that the friction of the engine 20 is decreased, that is, that the oil dilution occurs if the amount of intake air for keeping the idling engine speed to a predetermined speed is decreased (reduced) to a value lower than or equal to a predetermined threshold value and performs the control so that the engine 20 is operated at a higher speed.

The ECU 80 determines that the decrease in the friction of the engine 20 becomes greater and the degree of the oil dilution is increased (a greater amount of fuel is mixed into the engine oil) as the decrease in the amount of intake air for keeping the idling engine speed to a predetermined speed is increased. In contrast, the ECU 80 determines that the oil dilution does not occur or the oil dilution is inhibited if the amount of intake air for keeping the idling engine speed to a predetermined speed is not decreased (reduced) to a value lower than or equal to a predetermined threshold value.

When the ECU 80 determines that the oil dilution occurs and performs the control so that the engine 20 is operated at a higher speed, the ECU 80 requests the TCU 50 to control the gear shift ratio (the gear shift stage) of the automatic transmission 30 so that the engine 20 is operated at a higher speed (to move into low gear in the gear shift diagram) (transmits request information to the TCU 50 via the CAN 100).

When the TCU 50 receives the request from the ECU 80 via the CAN 100, the TCU 50 moves into low gear in the gear shift diagram of the automatic transmission 30 used in the gear shift control so that the engine 20 is operated at a higher speed in response to the request from the ECU 80.

Figure 3:
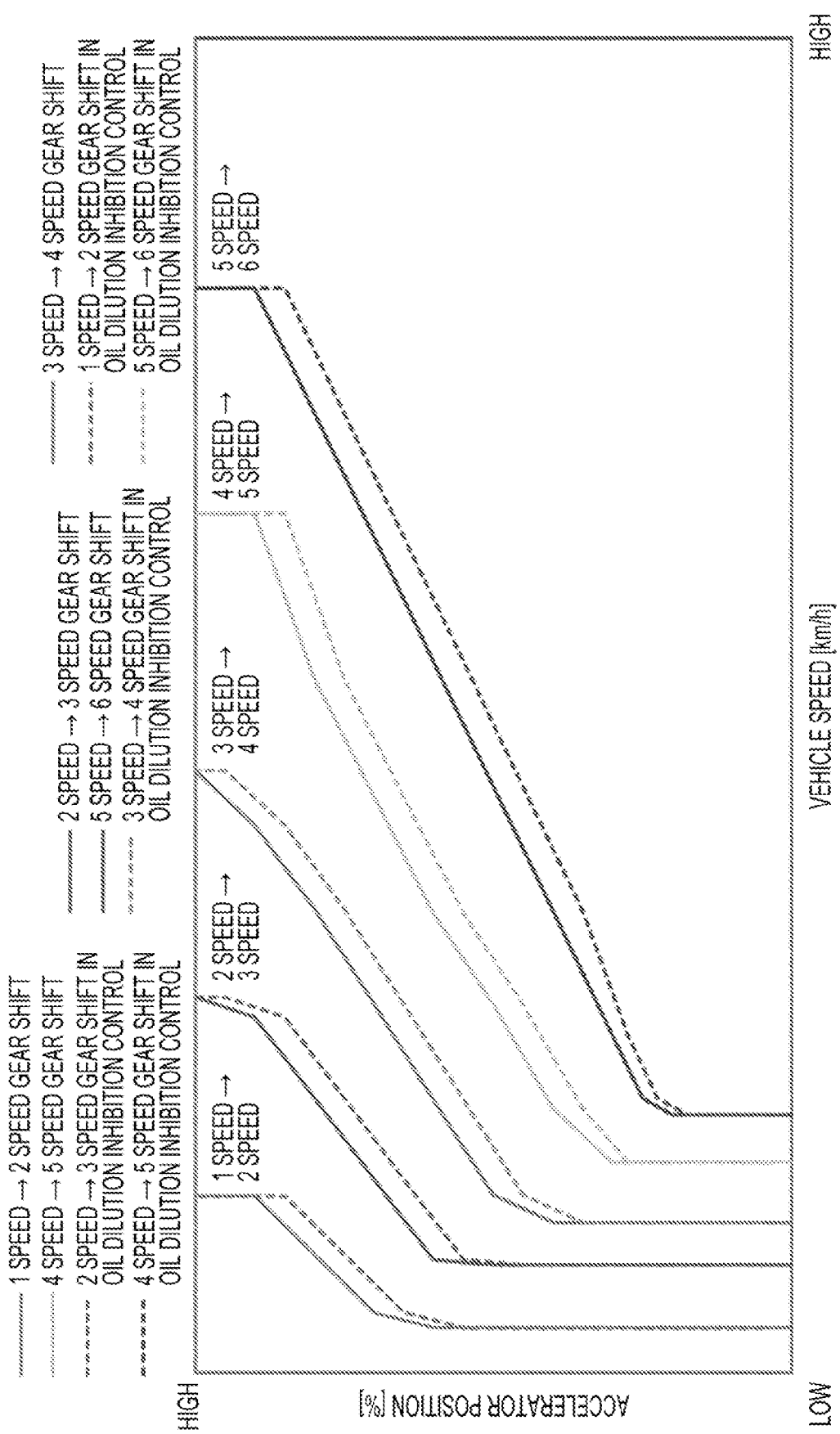
FIG. 3 illustrates an example of a gear shift diagram of the automatic transmission (step AT) used in oil dilution inhibition control.

An example of the gear shift diagram of the automatic transmission (step AT) 30 used in oil dilution inhibition control is illustrated in FIG. 3. Referring to FIG. 3, the horizontal axis represents vehicle speed (km/h) and the vertical axis represents the accelerator position (%). The gear shift diagram used in normal gear shift control is indicated by solid lines and the gear shift diagram used in the oil dilution inhibition control is indicated by dotted lines in FIG. 3. As illustrated in FIG. 3, in the oil dilution inhibition control, the gear shift (shift-up) is performed when the vehicle speed is higher than that in the normal control in all the gear shift stages (the vehicle speed at a shift-up point is increased). In other words, the gear shift (shift-up) is not performed until the vehicle speed is made higher than that in the normal control (moving into low gear). As a result, an operation area of the engine 20 is moved or extended to a higher speed side, compared with the operation area in the normal control, to promote increase in the temperature of the engine oil.

The ECU 80 and the TCU 50 desirably control the gear shift ratio (the gear shift stage) of the automatic transmission 30 so that the engine 20 is operated at a higher speed (desirably move into low gear in the gear shift diagram) as the decrease (reduction) in the amount of intake air for keeping the idling engine speed to a predetermined speed becomes greater.

The ECU 80 and the TCU 50 desirably perform the control (process) to inhibit the oil dilution described above after warm-up of the engine 20 is completed (that is, after the kinematic viscosity of the engine oil is decreased to be stabilized) in consideration of the temperature of the engine oil (the oil temperature). The ECU 80 is capable of determining whether the warm-up is completed from the temperature of the cooling water of the engine 20, the oil temperature, or the like.

Figure 2:
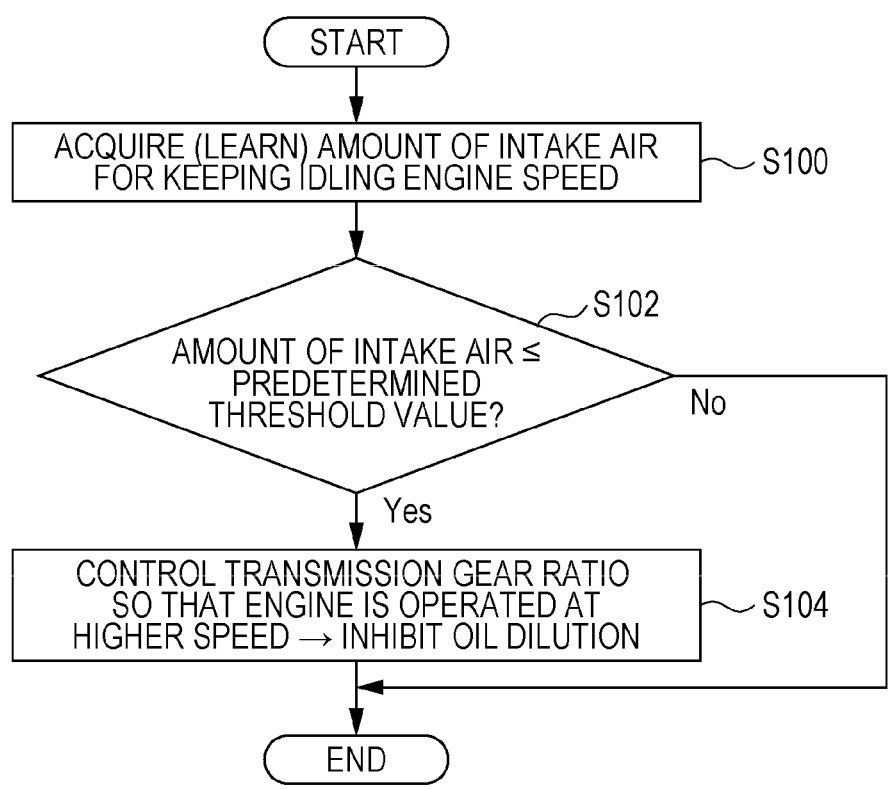
FIG. 2 is a flowchart illustrating an oil dilution inhibition control process, which is performed by the oil dilution inhibiting apparatus according to the embodiment.

An operation of the oil dilution inhibiting apparatus 1 will now be described with reference to FIG. 2. FIG. 2 is a flowchart illustrating an oil dilution inhibition control process, which is performed by the oil dilution inhibiting apparatus 1. The process is repeatedly performed at predetermined timing mainly in the ECU 80 and the TCU 50.

Referring to FIG. 2, after the warm-up of the engine 20 is completed, in Step S100, the amount of intake air for keeping the idling engine speed to a predetermined speed is acquired (learned). Since the method of acquiring (learning) the amount of intake air for keeping the idling engine speed to a predetermined speed is described above, a detailed description of the method is omitted herein.

In Step S102, it is determined whether the amount of intake air for keeping the idling engine speed to a predetermined speed is decreased to a value lower than or equal to a predetermined threshold value. If the amount of intake air for keeping the idling engine speed to a predetermined speed is decreased to a value lower than or equal to a predetermined threshold value (it is determined that the oil dilution occurs) (Yes in Step S102), the process goes to Step S104. If the amount of intake air for keeping the idling engine speed to a predetermined speed is not decreased to a value lower than or equal to a predetermined threshold value (it is determined that the oil dilution does not occur or the oil dilution is inhibited) (No in Step S102), the process illustrated in FIG. 2 is terminated. Then, the normal gear shift control using the gear shift diagram in the normal control is performed.

In Step S104, the gear shift ratio (the gear shift stage) of the automatic transmission 30 is controlled so that the engine 20 is operated at a higher speed (moving into low gear in the gear shift diagram). Since the control is described in detail above, a detailed description of the control is omitted herein. As a result, the temperature of the engine oil is increased and the fuel (gasoline) mixed into the engine oil is volatilized to inhibit the oil dilution. Then, the process illustrated in FIG. 2 is terminated.

As described above, according to the present embodiment, it is determined that the friction of the engine 20 is decreased, that is, that the oil dilution occurs if the amount of intake air for keeping the idling engine speed to a predetermined speed is decreased (reduced) to a value lower than or equal to a predetermined threshold value and the control is performed so that the engine 20 is operated at a higher speed. Accordingly, when the oil dilution occurs, the operation area of the engine 20 is moved or extended to the higher speed side to promote the increase in the temperature of the engine oil. Along with this, the volatilization of the fuel (gasoline) mixed into the engine oil is promoted to rapidly inhibit the oil dilution. As a result, it is possible to rapidly inhibit the oil dilution caused by the mixture of the fuel (gasoline) into the engine oil.

According to the present embodiment, when the control is performed so that the engine 20 is operated at a higher speed, the gear shift ratio (the gear shift stage) of the automatic transmission 30 is controlled so that the engine 20 is operated at a higher speed (moving into low gear in the gear shift diagram). Accordingly, the operation area of the engine 20 is moved or extended to the higher speed side to promote the increase in the temperature of the engine oil. Consequently, it is possible to promote the volatilization of the fuel mixed into the engine oil.

According to the present embodiment, the gear shift ratio (the gear shift stage) of the automatic transmission 30 is controlled so that the engine 20 is operated at a higher speed (moving into low gear in the gear shift diagram) as the decrease (reduction) in the amount of intake air for keeping the idling engine speed to a predetermined speed becomes greater. Accordingly, it is possible to move the gear shift ratio (the gear shift stage) of the automatic transmission 30 into low gear (to increase the vehicle speed at the shift-up point) depending on the degree of the oil dilution. Consequently, it is possible to move or extend the operation area of the engine 20 to the higher speed side to further promote the increase in the temperature of the engine oil (that is, further promote the volatilization of the mixed fuel) as the degree of the oil dilution is degraded (the amount of fuel mixed into the engine oil is increased).

According to the present embodiment, the control (process) to inhibit the oil dilution described above is performed after the warm-up of the engine 20 is completed. Accordingly, it is possible to determine the presence of the oil dilution after the kinematic viscosity of the engine oil is decreased to be stabilized to determine the presence of the oil dilution more appropriately.

Although the embodiment of the disclosure is described above, the disclosure is not limited to the embodiment and various variations are capable of being made. For example, the case is exemplified in the above embodiment in which the disclosure is applied to the planetary pinion step automatic transmission (step AT) 30, the disclosure may be applied to, for example, a step automatic transmission having two shafts that are parallel to each other, instead of the planetary pinion step automatic transmission 30. For example, the disclosure may be applied a chain or belt continuously variable transmission (CVT), a DCT, or the like, instead of the step automatic transmission (step AT) 30. When the disclosure is applied to the continuously variable transmission (CVT), for example, the gear shift ratio is desirably varied to the low side so that the engine speed of the engine 20 is increased at the same vehicle speed.

Although the case is exemplified in the above embodiment in which the disclosure is applied to the gasoline-engine vehicle using the gasoline engine 20 as a driving force source, the disclosure is applicable to a hybrid electric vehicle (HEV), a plug-in hybrid electric vehicle (PHEV), and so on, which use an electric motor or the like as the driving force source, in addition to the gasoline engine 20.

The system configuration is not limited to the configuration of the above embodiment. Although, for example, the ECU 80 controlling the engine 20 and the TCU 50 controlling the automatic transmission 30 are composed of separate hardware in the above embodiment, the ECU 80 controlling the engine 20 and the TCU 50 controlling the automatic transmission 30 may be composed of integrated hardware.

The ECU 80 and the TCU 50 illustrated in FIG. 1 can be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the ECU 80 and the TCU 50. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the non-volatile memory may include a ROM and a NVRAM. The ASIC is an integrated circuit (IC) customized to perform, and the FPGA is an integrated circuit designed to be configured after manufacturing in order to perform, all or a part of the functions of the modules illustrated in FIG. 1.

The invention claimed is:

1. An oil dilution inhibiting apparatus configured to inhibit oil dilution caused by mixture of fuel into engine oil, the oil dilution inhibiting apparatus comprising:
 a processor; and
 a memory having programs, when executed, causing the processor to be configured to:
  estimate friction of an engine;

determine that the oil dilution occurs when the friction of the engine is decreased to a value lower than or equal to a predetermined threshold value; and in response to determining that the oil dilution occurs, control the engine to operate at a higher first rotational speed set to be above a second rotational speed at which the oil dilution is detected.

2. The oil dilution inhibiting apparatus according to claim 1, wherein the processor is configured to estimate the friction of the engine based on an amount of intake air for keeping an idling engine speed at a predetermined speed, and wherein the processor is configured to determine that the oil dilution occurs when the amount of the intake air is decreased to a value lower than or equal to a predetermined threshold value.

3. The oil dilution inhibiting apparatus according to claim 2, wherein the processor is configured to, upon performing the control, control a gear shift ratio of an automatic transmission so that the engine is operated at the first rotational speed, the automatic transmission being configured to convert torque from the engine and output the converted torque.

4. The oil dilution inhibiting apparatus according to claim 3, wherein the processor is configured to control the gear shift ratio of the automatic transmission so that the engine is operated at the first rotational speed as the decrease in the amount of the intake air required for a predetermined idle speed becomes greater.

5. The oil dilution inhibiting apparatus according to claim 1, wherein the processor is configured to perform control to inhibit the oil dilution after warm-up of the engine is completed.

6. The oil dilution inhibiting apparatus according to claim 2, wherein the processor is configured to perform control to inhibit the oil dilution after warm-up of the engine is completed.

7. The oil dilution inhibiting apparatus according to claim 3, wherein the processor is configured to perform control to inhibit the oil dilution after warm-up of the engine is completed.

8. The oil dilution inhibiting apparatus according to claim 4, wherein the processor is configured to perform control to inhibit the oil dilution after warm-up of the engine is completed.

9. An oil dilution inhibiting apparatus configured to inhibit oil dilution caused by mixture of fuel into engine oil, the oil dilution inhibiting apparatus comprising circuitry configured to;

estimate friction of an engine;

determine that the oil dilution occurs when the friction of the engine is decreased to a value lower than or equal to a predetermined threshold value; and in response to determining that the oil dilution occurs, control the engine to operate at a first rotational speed set to be above a second rotational speed at which the oil dilution is detected.

* * * * *